United States Patent Office 3,495,245
Patented Feb. 10, 1970

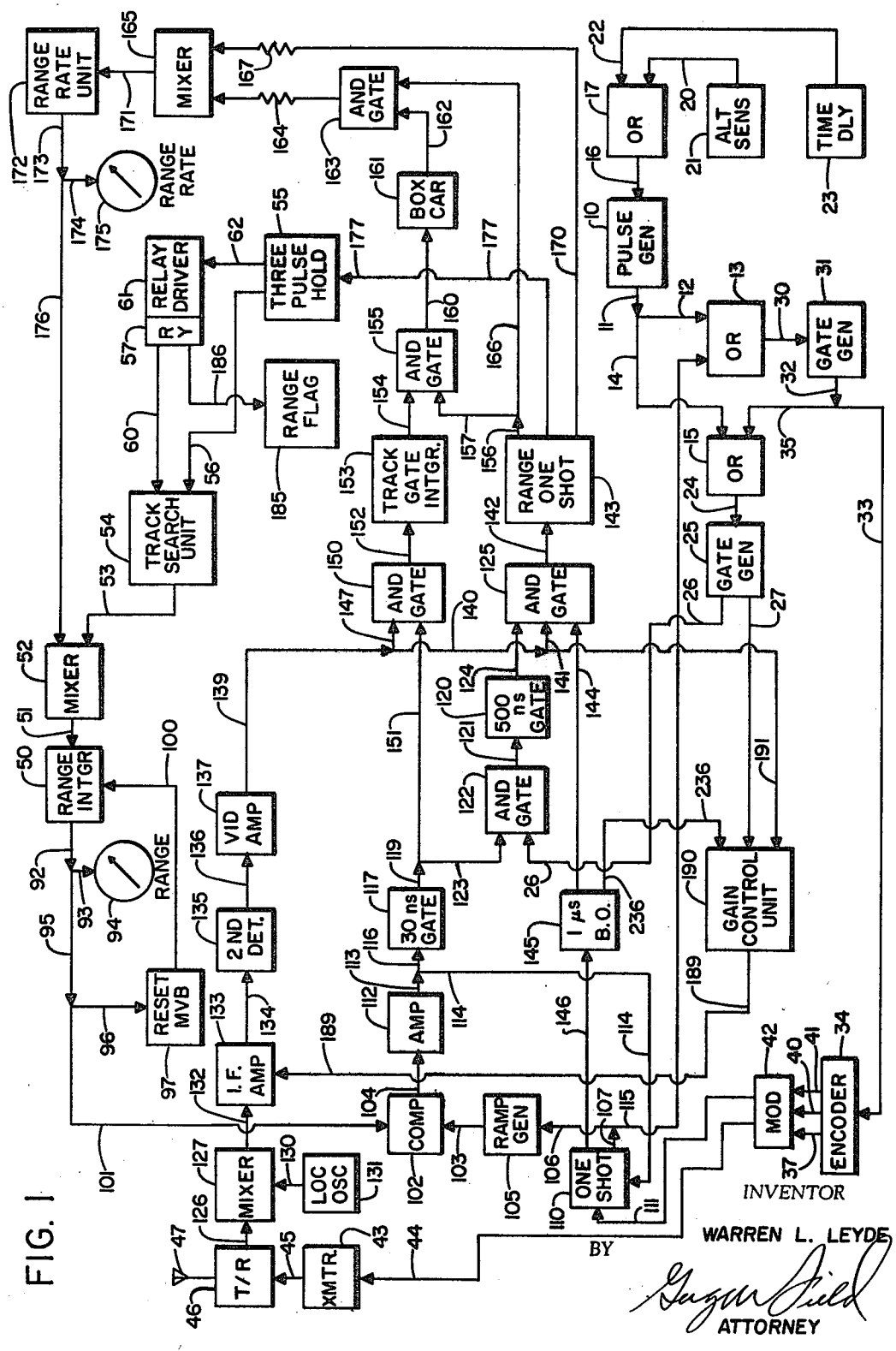

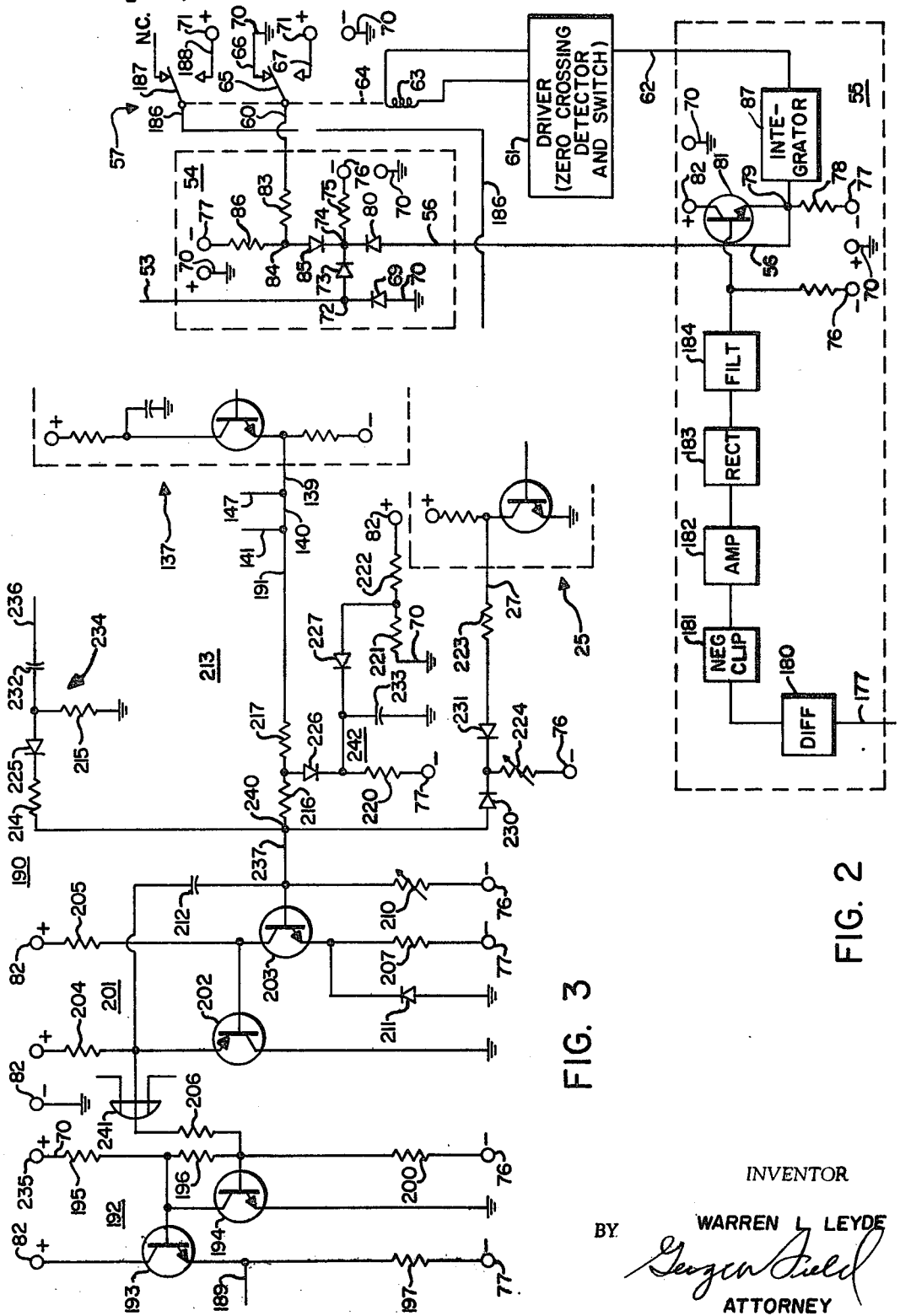

3,495,245
RADIO DISTANCE MEASURING SYSTEM
Warren L. Leyde, Seattle, Wash., assignor to Honeywell Inc., Minneapolis, Minn., a corporation of Delaware
Filed Aug. 11, 1967, Ser. No. 659,957
Int. Cl. G01s 9/02
U.S. Cl. 343—7.3   7 Claims

ABSTRACT OF THE DISCLOSURE

A radio distance measuring system in which the delay of a pair of gates of different lengths, in the cycle of transmission of interrogation pulses, is initially increased from a small value at a fixed rate determined by a first signal. When return pulses begin to occur within the longer of the two gates the first signal is replaced by a second, smaller signal to reduce the rate of increase of the delay. When the return pulses begin to appear within the shorter gate also, a third, opposing signal is added to the second signal to further reduce the rate, the third signal increasing as the return pulses are contained more fully within the shorter gate. When the second and third signals become equal the increase in delay is terminated, and the actual value of the delay is then a measure of the distance to be measured.

RELATED APPLICATIONS

The subject matter of this application comprises a portion of the aeronautical system which makes up the subject matter of the co-pending application of Warren L. Leyde, Ser. No. 574,225, filed Aug. 22, 1966 and assigned to the assignee of the present application. It comprises an improvement on the subject matter of Leyde Patent 3,242,488.

BRIEF SUMMARY

The invention comprises improved radio means for measuring distance or range between a local or interrogating station and a remote or transponding station, the improvement residing especially in providing means, including a pair of gates of unequal length, which operates in a first mode to search for return pulses and in a second mode to track the return pulses after the search has been successful: the double gate arrangement makes it possible to reduce the rate of search as it approaches success to prevent inadvertent overshoot and the concomittant necessity for a second search. By this means the greater part of the search phase can be conducted at an advantageously high rate without decreasing the accuracy of the system as an indicator during the subsequent tracking phase.

This invention relates to the field of supervisory apparatus and more specifically to apparatus to be carried in a vehicle such as an aircraft and used to inform the vehicle operator of his distance or range to a remote point provided with transponding equipment, and of the rate of change of that range. Apparatus of this sort must first "search" to bring its indications into agreement with the actual situation of the vehicle, and then "track" or maintain its indications in agreement with actuality as the vehicle moves toward (or away from) the remote point. Such apparatus is known, and uses "leading edge tracking" for maximum accuracy: it is a principal object of the present invention to improve equipment of this sort by making possible rapid initial search while maintaining accurate indications during tracking.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

BRIEF DESCRIPTION OF THE DRAWING

In the drawing FIGURE 1 is a block diagram of a system according to the invention, and FIGURES 2 and 3 give details of certain components. The disclosure presents subject matter shown in FIGURES 4A and 4B of the co-pending application, which also includes a detailed disclosure of the contents of various other blocks: this disclosure is incorporated by reference herein for completeness, although it is not believed indispensable to the understanding of the present invention.

DETAILED DESCRIPTION OF THE INVENTION

The disclosure herein is of one preferred embodiment of the equipment at the local station only, since any suitable type of transponding apparatus may be used: one such transponding arrangement is shown in detail in the co-pending application.

PRINCIPLES OF RANGE MEASUREMENT

Range measurement with the present invention is accomplished by measuring the time interval between the transmission, from a local station, of the last pulse of a packet of three time coded pulses, and the reception, at the local station, of a single pulse returned from a remote station in response to reception there of the pulse packet from the local station. The transponding procedure at the remote station is arranged to involve a fixed time delay of known magnitude, and a compensating delay is provided at the local station receiver. The speed of transmission of electromagnetic energy is 186,000 miles per second, which means that a $5.4\mu$ delay occurs for each round trip statute mile between the two stations, or $10.8\mu$ delay for each actual mile of distance. The elapsed time is measured by measuring the displacement of a gate pulse, from a zero position compensated for the fixed delay, when the gate has been adjusted to accept the return pulse.

In performing the range measurement, it is first necessary that the equipment "search," by scanning the gate through the total range of possible distances between the two stations, to detect what the actual value of range is, and then "track" the returning pulses as their delay changes with change in the displacement of the local station relative to the remote station.

It will be realized that if the local station for example is approaching the remote station, the range is decreasing; for this condition, range rate is arbitrarily defined as positive. If the local station is receding from the remote station, the range is increasing, and the range rate is defined as negative. The former is the primary use of the invention, although, if the apparatus has achieved a tracking condition, it can thereafter maintain the condition for movement of the local station in either direction.

RANGE INTERROGATION

FIGURE 1 shows the local station equipment used for range interrogation to include a pulse generator 10, which supplies positive square wave pulses at a repetition rate of 320 p.p.s. on conductors 11 and 12 to a first OR circuit 13, and on conductors 11 and 14 to a second OR circuit 15. Generator 10 may be disabled by a signal on conductor 16 from a third OR circuit 17 having a first input on conductor 20 from an altitude sensor 21, if the local station is at an altitude of more than 25,000 feet, and a second input on conductor 22 from a time delay circuit 23, if the power supply for the system has not been operating for at least 30 seconds. The system power supply may be conventional and is not shown.

Each generator pulse transmitted through OR circuit 15 acts through conductor 24 to trigger a gate generator 25 which supplies positive and negative going enabling pulses on conductors 26 and 27 respectively. Each generator pulse transmitted through OR circuit 13 acts through conductor 30 to trigger a gate generator 31 which acts through conductors 32 and 33 to trigger an encoder 34, and through conductors 32 and 35 to supply a second input to OR circuit 15. OR circuit 13 further includes means for maintaining a signal on output conductor 30 for 50μ after any input signal thereto ceases.

As suggested at 37, 40, and 41, encoder 34 supplies a time coded train of three 100 ns. pulses to a modulator 42, which pulses trigger a transmitter 43 through a conductor 44. The output pulses of the transmitter pass through conductor 45 and a transmit-receive device 46 to an omnidirectional antenna 47.

The portion of the local station equipment thus far described functions to transmit, omnidirectionally from antenna 47, interrogation packets of three 100 ns. pulses, the successive pairs of pulses making up the packet being spaced according to a predetermined code. These packets are repeated 320 times per second unless generator 10 is inhibited by a signal from OR circuit 17. The pulse packets are received at a suitable remote station and result in the radiation therefrom of single 100 ns. pulses. The delay in the remote station is known, and when this is taken into consideration the interval between the pulse transmission from antenna 47 and the subsequent reception on antenna 47 of a return pulse is a measure of the range desired.

RANGE RESPONSE RECEPTION AND PRESENTATION

The local station equipment associated with the reception of return pulses from the remote station will now be described. In the upper portion of FIGURE 1 there is shown a range integrator 50 which initially functions as a first ramp generator because of a small fixed negative signal supplied to it through conductor 51, a mixer 52, and conductor 53 from a "track-search" unit 54. Unit 54 operates under the control of a "three pulse hold" unit 55, to which it is connected by conductor 56, and of a relay 57 to which it is connected by conductor 60. Relay 57 is energizable by a relay driver 61 which is connected by conductor 62 to unit 55 for control thereby.

FIGURE 2 gives details of members 54, 55, 57, and 61, which are also shown in detail in the co-pending application referred to above. Relay 57 is shown to comprise a winding 63 which actuates an armature 64 to displace a first movable contact 65 out of normal engagement with a first fixed contact 66 and into engagement with a second fixed contact 67. Fixed contact 66 is grounded at 70. Fixed contact 67 is connected to a heavy duty source 71 of voltage which is 28 volts positive with respect to ground.

Driver 61 includes a switching circuit actuated by a zero crossing detector whenever the input on conductor 62 becomes positive. The structure is conventional, and will not be described in detail: initially relay 57 is not energized.

A circuit may be traced in unit 54 from ground 70 through a diode 69, a junction point 72, a diode 73, a junction point 74, and a resistor 75 to a voltage source 76 negative with respect to ground by 24 volts. Junction point 72 is thus maintained slightly negative with respect to ground, and this negative voltage is supplied on conductor 53 as a constant input for integrator 50.

A second circuit may be traced in FIGURE 2 from a voltage source 77, in unit 55, negative with respect to ground 70 by 7 volts, through a resistor 78, a junction point 79, conductor 56, diode 80, junction point 74, and resistor 75 to source 76. In this circuit diode 80 is normally back biased and junction point 74 is accordingly isolated. Resistor 78 is connected to comprise the emitter resistor of a transistor 81 having its collector connected to a source 82 which is positive with respect to ground by 15 volts. Initially transistor 81 is not conductive.

A third circuit can be traced in FIGURE 2 from ground 70 through relay contacts 66 and 65, conductor 60, a resistor 83, a junction point 84, a diode 85, junction point 74 and resistor 75 to source 76. Junction point 84 is connected through a resistor 86 to source 77, back biasing diode 85 and isolating junction point 74.

Junction point 79 in unit 55 is connected through an integrator or lag circuit 87 to conductor 62.

In response to the fixed initial negative signal on conductor 53, FIGURE 2, integrator 50 operates to supply at output conductor 92 a signal which increases linearly at a constant rate. This output is supplied through conductor 93 to a range indicator 94, and also, through conductors 95 and 96, to a reset multivibrator 97. When the integrator output reaches a predetermined value of 50 volts, multivibrator 97 switches and conductor 100 provides a signal to integrator 50 which results in the discharging of the integration capacitor and the resetting of the output voltage on conductor 92 to zero. Multivibrator 97 thereupon returns to its normal state. Thus, initially integrator 50 acts as a sawtooth generator which is reset at the 50 volt level by multivibrator 97. The normal period of this sawtooth generator is approximately 2 seconds.

The output of integrator 50 is further supplied through conductors 92, 95, and 101 to a comparator 102, which has a second input conductor 103 and which supplies its output on conductor 104. The second input to comparator 102 is derived from a ramp generator 105 triggered through conductors 106 and 107 from a one-shot 110. This one-shot is fired by a signal on conductor 111 from modulator 42, which signal is supplied each time modulator 42 supplies a third code pulse to transmitter 43. As long as one-shot 110 supplies an input to generator 105, the output of the latter increases linearly at a first rate: when the signal from the one-shot is removed, the generator output decreases to an initial slightly negative value.

Generator 105 is so construtced that if one-shot 110 continues to supply its signal for its full natural period, the generator output reaches a value equal to the maximum output of integrator 50, that is, a value of 50 volts. The magnitude of the initial slight negative value is such that the interval needed for the generator output to reach zero, that is 1.5μ, is equal to the delay at the remote station between the reception of an interrogation and the transmission of a response.

As long as the signal on conductor 101 is greater than that on conductor 103, comparator 102 supplies no output. When the signal on conductor 103 exceeds that on conductor 101, comparator 102 supplies an output which is fed through conductor 104, and amplifier 112, and conductors 113 and 114 back to one-shot 110 to reset it, and the output of generator 105 returns to its initial, slightly negative value.

One-shot 110 is connected by conductors 107 and 115 to supply a second input to OR circuit 13, maintaining the output on conductor 30 even after the inherent delay in the OR circuit has elapsed, until one-shot 110 has returned to normal.

The output of amplifier 112 is also supplied through conductors 113 and 116 to trigger a 30 ns. gate 117, which in turn triggers a 500 ns. gate 120, through conductor 121, an AND gate 122, and conductors 123 and 119. Gate 122 is currently enabled by generator 25 through conductor 26, and gate 120 accordingly supplies an enable signal 500 ns. long on conductor 124 to an AND gate 125.

When return pulses from the remote station are received on antenna 47 they pass through transmit-receive device 46 and conductor 126 to a mixer 127, which also receives signals on conductor 130 from a local oscillator 131. The mixer output is supplied on conductor 132 to a variable gain intermediate frequency amplifier 133, and thence on conductor 134 to a second detector 135. The detector output on conductor 136 is supplied to a video amplifier 137, and its output in turn is supplied on conductors 139, 140, and 141 as a second input to gate 125.

If the video signal occurs during the 500 ns. when gate 125 is enabled, it is normally transmitted on conductor 142 to a 100μ "range" one-shot or gate 143. Gate 125 may be disabled, however, by a signal on conductor 144 from a 1μ blocking oscillator 145. Oscillator 145 is triggered through conductor 146 by one-shot 110, and disables gate 125 for 1μ immediately after one-shot 110 operates.

The signal from video amplifier 137 is also supplied, on conductors 139 and 147, to an AND gate 150, which is enabled by 30 ns. gate 117 through conductor 151 for a 30 ns. interval beginning the same time as the 500 ns. interval during which gate 120 enables gate 125. A 30 ns. portion of the video amplifier output is passed by gate 150 and is supplied on conductor 152 to a track gate integrator 153, the output of which is supplied on conductor 154 to an AND gate 155.

One-shot 143 acts through conductors 156 and 157 to enable AND gate 155, thus supplying the output of integrator 153 through conductor 160 to a "boxcar" 161 which supplies its output through conductor 162, an AND gate 163, and resistor 164 to a mixer 165. AND gate 163 is simultaneously enabled by one-shot 143 through conductors 156 and 166. The boxcar signal, when AND gate 155 is enabled, is of substantially constant amplitude determined by the input on conductor 160: except when a video pulse occurs during the 30 ns. period of gate 117, this input is of course zero.

A second signal of opposite sense is supplied to mixer 165 from one-shot 143 through conductor 170 and resistor 167. The output of mixer 165 is supplied on conductor 171 to a range rate (Ṙ) unit 172, which supplies a first output through conductors 173 and 174 to a range rate indicator 175, and a second output through conductors 173 and 176 and mixer 52 to input conductor 51 of range integrator 50.

Except during the 500 ns. interval when gate 125 is enabled, one-shot 143 disables gates 155 and 163 and supplies no signal on conductor 170, so that no signal is supplied by mixer 165 to unit 172. It will be realized that one-shot 143 is not actuated unless a video pulse occurs during the 500 ns. conducting period of gate 120.

Integrator 153 gives an output representative of the energy contained in the gated portion of the video pulse. Assuming uniform pulse transmission and attenuation, which has been found to introduce no serious errors, and further assuming proper automatic gain control to maintain pulse amplitude constant without clipping, the output of integrator 153 is determined by the timing of gate 117 with respect to the video pulses.

The signal supplied to mixer 165 from gate 143 through resistor 167 is of a magnitude equal to what the signal should be from boxcar 161 through resistor 164 if the 30 ns. gate were positioned in a particular time relation to the leading edge of the 100 ns. video pulse, on the foregoing assumptions of uniform pulse transmission, retransmission, and attenuation, and for a stationary interrogator. The speed of transmission of radio energy is so great compared to the speed of even the fastest moving vehicle, that over a period of a few hundred microseconds any commercial vehicle can be considered stationary.

Gate 143 also supplies a pulse on conductor 177 to three pulse hold unit 55, which is shown in FIGURE 2 to include a differentiator 180, a negative clipper 181, an amplifier 182, a rectifier 183, and a filter 184, the latter energizing transistor 81. This unit provides a pulse on conductor 56 which rises rapidly during each operation of gate 143 and decreases between operations at a slower rate: each pulse is supplied to track-search unit 54, and acts to back bias diode 73 and hence to disable the normal supply of continuous negative voltage on conductor 53 to mixer 52 and range integrator 50, so that the only input to integrator 50 is now that from conductor 176.

If only a single pulse is supplied on conductor 177 the output from unit 55 continues for ten milliseconds to disable the normal ramp producing signal in unit 54, after which interval the intial conditions are re-established. Although junction joint 79 goes positive for a time, the interval is not sufficient for the initial negative output from integrator 87 to be overcome, and relay 57 is not energized. When successive pulses pass gate 125 and trigger one-shot 143, operation of integrator 87 changes the signal on conductor 62 in a positive direction. With the third successive pulse it crosses zero, at which time the zero crossing detector in driver 61 actuates the switch to energize relay 57. The relay ungrounds conductor 60 and instead connects it to positive source 71, overcoming the back bias on diode 85 and now back biasing diode 73 independently of the similar operation occurring through conductor 56.

Once a succession of pulses has brought the output of integrator 87 to a positive value, the omission of one or even two pulses in succession does not allow the integrator output to drop below zero: this does occur when three or more pulse intervals in succession occur without pulses, and relay 57 drops out to re-establish initial conditions.

Relay 57 also functions to actuate a range flag 185, which is energized through conductor 186 and normally open relay contacts 187 and 188 from source 71 to withdraw from its normally visible warning position. Flag 185 is normally a portion of indicator 94.

It was previously mentioned that the correct operation of the system calls for adequate gain control to maintain all return pulses at the same amplitude as they leave the video amplifier. This is accomplished by varying the gain of intermediate frequency amplifier 133 with a control signal supplied through conductor 189 from gain control unit 190, to which the video pulses are supplied from amplifier 137 through conductors 139, 140, and 191.

Unit 190 is shown in FIGURE 3 to comprise an inverter 192 including transistors 193 and 194 and resistors 195, 196, 197, and 200; a noise automatic gain control (NAGC) circuit 201 including transistors 202, and 203, resistors 204, 205, 206, 207, and 210, a diode 211, and a capacitor 212; and an input logic 213, including resistors 214, 215, 216, 217, 220, 221, 222, 223, and 224, diodes 225, 226, 227, 230, and 231 and capacitors 232, and 233, the former cooperating with resistor 215 to comprise a differentiator 234. Also included in unit 190 are negative sources 76 and 77 and further sources 235 and 82 which are more and less positive, respectively, than source 71 of FIGURE 2. In one embodiment of the invention source 77 was −24 volts, source 76 was −7 volts, source 82 was +15 volts, and source 235 was +60 volts, all with respect to ground 70.

Logic 213 receives inputs on conductors 27, 191, and 236 from gate generator 25, video amplifier 137, and blocking oscillator 145, all respectively, and energizes NAGC circuit 201 through conductor 237 and junction point 240. NAGC circuit 201 energizes inverter 192 through a connection including resistor 206. In a preferred embodiment of the invention this connection also includes an OR circuit 241 having two further inputs: these are not pertinent to the present invention and are not shown in FIGURE 3. Inverter 192 supplies its output on conductor 189 to intermediate amplifier 133, to control the gain thereof.

OPERATION

The object of the present invention is to provide means for determining the distance between a local, interrogation station and a remote, transponding station. This is done by measuring the time interval between the instant of transmission of the third pulse in a packet of pulses from the interrogator, and the instant of reception of the return pulse from the transponder. The time measurement is accomplished by observing the interval by which an adjustable gate must be delayed, after transmission of the third pulse, in order to occur concurrently with the return pulse. For reasons presently to be set forth a pair of gates are used rather than a single gate.

The magnitude of the delay is determined by the voltage applied to comparator 102 through conductor 101, and is displayed on indicator 94. As long as the delay is such that the gates are always positioned to receive the returned pulses, the voltage producing that delay is a true measure of range. The voltage in question comes from integrator 50, so that the input to integrator 50 must then be the rate of change of range, or range rate. When the signal on conductor 176 is the only input to integrator 50, that signal is representative of range rate and is accurately displayed on indicator 175.

The operation of this system will be explained first for the simplest condition, that of a local station located or moving at a constant distance from the remote station, with the system "tracking" or maintaining the readings of indicators 94 and 175 at the correct values. The local station is at an altitude of less than 25,000 feet, so that corona discharges in electronic equipment present no hazard, and has been in operation for more than 30 seconds. Generator 10 is therefore not disabled, and begins supplying 150$\mu$ positive square wave pulses to OR circuits 13 and 15, at a rate of 320 repetitions per second.

The leading edge of each generator pulse passing through OR circuit 15 triggers generator 25 to supply a negative going square wave enabling pulse on conductor 27 to gain control unit 190, and a positive going square wave enabling pulse on conductor 26 to AND gate 122. These enabling pulses continue for 50$\mu$ after the pulse from generator 10 terminates. The trailing edge of each generator pulse passing through OR circuit 13 triggers generator 31 to supply a positive going square wave pulse on conductor 33 to enable and trigger encoder 34, and on conductor 35 to extend the output pulses from generator 25 independently of the natural 50$\mu$ holding action of OR circuit 15.

Encoder 34 supplies to modulator 42 a packet of three spaced pulses for each input pulse received by the encoder. The spacings between the two pairs of pulses in the packet are chosen, as for example by manually operable setting means, to agree with a decoder at a remote station: the maximum interval between the first and third pulses is about 10$\mu$. Transmitter 43 is accordingly modulated to supply three time-coded 100 ns. pulses of radio frequency energy having a carrier frequency of 5.1 gHz., and these pulses are radiated omnidirectionally from antenna 47 for reception by any remote stations tuned to 5.1 gHz. which are within the range of the transmitter. A smaller or larger number of pulses per packet may of course be used by suitable modification of encoder 34 and the remote decoder, so long as the last pulse of the packet occurs within the 50$\mu$ holding interval of OR circuit 15.

The use of a time coded packet of interrogation pulses rather than a single interrogation pulse has a number of advantages: it prevents single adventitious noise pulses from triggering the remote station; it permits each of several local stations operating simultaneously in a common area to interrogate one selected remote station only when several of these are also within the common area, thus removing any possible confusion due to plural responses, and it reduces power consumption at remote stations by obviating the need for continuous transmission of responses from all remote stations within the range of a local station transmitter whether or not they are of interest. A suitable transponder for use at remote stations is shown in the copending application referred to above. If it is desired to forego the advantages of coded interrogation, the complexities of both local and remote stations can be somewhat reduced.

At the remote station the pulse packet has been passed through a decoder and if properly coded results in generation and radiation of a single 100 ns. pulse of radio frequency energy at a frequency of 5.1 gHz. If the packet is not properly coded, no response pulse is radiated. A delay is inherent at the remote station between reception of the last pulse of the packet and transmission of the response, and this delay is arbitrarily given a fixed duration of 1.5$\mu$.

At the same time that it supplies the last pulse of each packet to transmitter 43, modulator 42 also supplies a trigger pulse to one-shot 110. The latter fires, supplying a signal on conductors 107 and 115 to OR circuit 13, which maintains operation of generator 31 and hence, through OR circuit 15, that of generator 25, even after the 50$\mu$ holding interval of OR circuit 13 has expired. At the same time one-shot 110 initiates operation of ramp generator 105 through conductors 107 and 106. Generator 105 starts sweeping in a positive direction, from an initial negative value so chosen that the sweep crosses zero after 1.5$\mu$. This interval is the same as the preset overall delay in any remote station between its reception of the third pulse of an interrogation packet and its transmission of a reply pulse in response thereto.

The output of generator 105 comprises one input to comparator 102, and the output of the first sawtooth generator comprises the other input thereto and is currently representative of the range being measured. When in its sweep the former becomes greater than the latter, the comparator applies an output which is fed through amplifier 112 and back to one-shot 110 to reset it. This removes the holding signal on OR circuit 13, allowing the signals from generators 31 and 25 to terminate. It also returns the output of ramp generator 105 to its initial negative value, where it remains until one-shot 110 is again triggered. The peak output from generator 105 is 50 volts, like that of the first sawtooth generator, and its slope corresponds to a natural period of about 120$\mu$. The actual length of an individual ramp is determined by the instantaneous value of the first sawtooth output, being longest when that output is greatest. One-shot 110, generator 105, comparator 102, and amplifier 112 thus cooperate to comprise another sawtooth generator of variable period not longer than about 120$\mu$.

In addition to resetting one-shot 110, the output of amplifier 112 when comparator 102 operates is effective to trigger 30 ns. gate 117, which enables AND gates 150 for 30 ns. The signal from gate 117 also passes through AND gate 122, while it is enabled from generator 25 through conductor 26, and triggers 500 ns. gate 120, which accordingly enables AND gate 125 for 500 ns. Gates 150 and 125 are thus made conductive at substantially the same time, although gate 150 remains conductive for only 30 ns. while gate 125 remains conductive for 500 ns. The delay between the instant of transmission of the third pulse and the instant at which gates 125 and 150 are made conductive is determined by the input to comparator 102 on conductor 101.

The return signal from the remote station appears on antenna 47 and passes through transmit-receive device 46, mixer 127, amplifier 133, and detector 135 to amplifier 137, the output of which is transmitted on conductors 139 and 147 to gate 150, and on conductors 139, 140, and 141 to gate 125. Gate 125 being presently enabled by gate 120, the video pulse passes through it and triggers one-shot 43 to supply three signals of 100$\mu$ duration. The first is an enable signal for AND gates 155 and 163, and appears on conductors 156, 157, and 166. The second appears on conductor 177 and acts through three pulse hold unit 55 and driver 61 to retain relay 57 in an actuated position. Relay 57 acts through conductor 60, and unit 55 further acts through conductor 56, to inhibit unit 54 from supplying any signal on conductor 53, so the only signal to integrator 50 is that on conductor 176. The third signal from one-shot 143 is supplied through resistor 167 as a first input to mixer 165.

Gate 150 also being presently enabled, the video amplifier is connected to track gate integrator 153. Gate 150 is only conductive for 30 ns., while the video pulse is about 100 ns. long, so that only a portion of each video pulse passed to integrator 153: these pulses all have the same wave shape and are maintained constant in amplitude by gain control unit 190, so that if gate 150 is made conductive at exactly the same instants in the successive video pulses, the energy passed by the gate during successive pulses will always be the same. Integrator 153 supplies outputs, representative of the energy contained in 30 ns. portions of successive pulses, through gate 155 to boxcar 161, which in turn supplies, for the full 100µ interval during which gate 155 is maintained conductive by one-shot 143, a signal of constant amplitude determined by the track integrator signal. The boxcar signal is transmitted through gate 163, currently maintained conductive by one-shot 143, and through resistor 164, as a second input to mixer 165 of opposite sense to that supplied through resistor 167. Resistors 164 and 167 are so selected that the constant amplitude signal through the latter has the value assumed by the former when the video pulses occur in a predetermined time relation to the opening of gate 150 by gate 117, which at the moment is assumed to be the case. The signal to range rate unit 172 is thus zero, and the indicator output is zero since the range between the local and remote station has no rate of change. This zero signal to integrator 50 results in the integrator output remaining the same. Accordingly, successive sweeps of generator 105 all terminate at the same value, the gate delay remains constant, and a properly operating system results.

Now assume the local station moves toward the remote station, so that the actual range is decreasing. The video pulses reach gate 150 slightly earlier compared to the operation of gate 117, so that energy gated to integrator 153 is slightly greater. The signal to mixer 165 through resistor 164 now slightly exceeds that through resistor 167 and 100µ pulses of a first polarity are supplied to unit 172. These result in a gradually increasing output at 173 which appears as a signal on range rate indicator 175 and which acts on integrator 50 to decrease the reading of indicator 94 and the signal on conductor 101.

The decreased signal results in an earlier output from comparator 102, so that the gates open after a shorter delay than before, until they again occur at the appropriate instant to transmit the predetermined portion of the video amplifier pulse: the output from mixer 165 now becomes zero again, and the output from unit 172 has a value which causes the output of integrator 50 to decrease at some particular rate. If this rate is the same as the rate of change of the range being measured, the system operation continues without change, and the system is said to be tracking. If tracking is not perfect the position of the gates relative to the video pulses begins to change, changing the input to mixer 165 and thus correcting the system operation.

From the above it will be apparent that the output of integrator 50 controls the delay of the gates, that this delay is servoed to agree with the actual delay of the return pulse determined by the range being measured, and that when this is accomplished the input to mixer 52 and hence to integrator 50 can only be the first derivative of the integrator output and hence the range rate.

It will perhaps not be so apparent how the apparatus is brought into the tracking condition initially, and the "search" procedure by which this is accomplished will now be explained. Generator 10 operates through members 13, 31, 34, 42, 110, 105, and 102 to trigger gate 117 repeatedly whether or not any video amplifier pulse occurs while gates 125 and 150 are conducting. Comparator 102 gives an output for each generator pulse, after a delay determined by the magnitude of the signal on conductor 101 at that particular instant. When the apparatus is first turned on it is likely that the video pulses do not occur within the gates: under these conditions no signals are applied to range rate unit 172 or three-pulse hold unit 55. Track-search unit 54 has no inhibiting inputs, and hence supplies a signal of fixed magnitude on conductor 53 to mixer 52, which has at this time no other input. Integrator 50 then functions as the first saw-toothed generator referred to above, giving an output on conductor 101 which increases at 25 volts per second to a maximum of 50 volts and then is reset to repeat the saw-tooth. The second mentioned saw-tooth generator is also operating to supply a second saw-tooth output on conductor 103 which increases at the rate of 50 volts per 120µ until reset by comparator 102. Since for each successive operation of generator 105 the signal on conductor 101 is larger by approximately 80 millivolts, the delay in gate operation increases in steps of about 190 ns. The system is "searching" the intervals subsequent to the third pulse transmissions for the presence of return pulses, by delaying the gates in increasing steps of 190 ns., beginning at some random initial value of signal on conductor 101. It can happen that this random value is already greater than that corresponding to the actual range, in which case the sweep continues until reset by multivibrator 97, and then starts over from a value corresponding to minimum range.

A gate of 30 ns. moved in steps of 190 ns. could entirely skip over a 100 ns. pulse. The narrow gate is necessary to produce the desired accuracy in final range determination, but a search in steps small enough to insure complete coverage by a narrow gate is impractically slow. The reason for the two gates now becomes evident. If a 500 ns. gate is stepped by successive increases of 190 ns., the successive range samples actually overlap so that no 100 ns. portion of the interval being scanned is omitted.

As pointed out earlier, gates 117 and 120 are rendered conductive simultaneously, but the latter remains conductive many times as long as the former. As these two gates are simultaneously scanned through the 120µ interval following pulse transmission, in a direction of increasing delay, a return pulse eventually occurs within gate 120, although not yet within gate 117. The pulse ceases before AND gate 150 is rendered conductive, but can pass through gate 125 and trigger one-shot 143. The latter supplies its standard signal through resistor 167 and renders gates 155 and 163 conductive, but no signal is supplied by unit 153 and thus only the signal on resistor 167 is supplied through mixer 165 to unit 172.

One-shot 143 also supplies a signal to three-pulse hold unit 55, which is transmitted to track-search unit 54 and to driver 61. The latter signal is not yet large enough to cause operation of relay 57, but the former signal disables unit 54, for 10 milliseconds, from supplying a signal to mixer 52. The only signal to the latter is thus the output from unit 172 which, while of the same sense as that formerly supplied on conductor 53, is nevertheless considerably of less magnitude. The slope of the output of integrator 50 is thus substantially reduced, for a period corresponding to approximately three pulse intervals of generator 10. The size of the search step is reduced to that which would be used for a 30 ns. gate alone, and system operation continues.

Ordinarily, once a video signal has occurred within gates 125, succeeding signals also occur within the gate. If three successive signals are so received three pulse hold unit 55 supplies a sufficient signal for driver 61 to energize relay 57, which operates to disable track-search unit 54, independently of the signal on conductor 56, from supplying a signal on conductor 53 to mixer 52, and system operation remains unchanged. If another pulse does not occur within the 10 ns. interval referred to above, the signal on conductor 56 disappears, and search operation with the original, larger interval is resumed. Likewise, once relay 57 is energized it will remain so even though one or two successive intervals pass without any pulses being received. Continued absence of pulses however causes unit 55 to release relay 57, and to re-enable unit 54, re-establishing the initial search conditions.

Now returning to the case where a continuous train of video pulses is reaching gate 125 and search is continuing at the reduced rate. The gates are further delayed in small steps, and presently they are positioned so that the video pulses begin to occur during the conductive period of gate 150 as well. Each pulse affects track gate integrator 153 to give an output determined by the energy contained in the gated portion of the pulse, and boxcar 161 gives a constant output, for the entire 100μ interval that gates 155 and 163 are enabled by one-shot 143, determined in magnitude by the track gate integrator output. At first only a very small portion of the leading edge of the video pulse may pass gate 150, and the resulting signal through resistor 164, while of the sense to oppose that through resistor 167, is of only small magnitude and hence only reduces the mixer output slightly. The output of range rate unit 172 is slightly decreased, and the slope of the output of integrator 50 is hence slightly decreased. Increase in the delay continues, albeit at a somewhat reduced rate, bringing more and more of the video pulse within gate 150 and increasing more and more the opposing signal to mixer 165, until presently that signal has become equal to that through resistor 167, and tracking of the system has been achieved.

Range flag 185 in its unenergized condition is visible to the system operator indicating that the reading of indicator 94 is not reliable. By the time a continuing train of pulses passes through gate 125 and triggers one-shot 143 the output of integrators 50 is substantially correct, and operation of relay 57 withdraws flag 185.

As previously mentioned the output of video amplifier 137 is supplied to gain control unit 190 for the purpose of maintaining all the video pulses at the same amplitude, so that when gate 150 cuts the video pulses at the same amplitude it will also cut them at the same time in the pulse: this is "leading edge tracking" and is inherently more accurate than attempting to track the beginning or the peak of the pulse, for example. It has been found desirable to add an STC (sensitivity time control) feature to this unit. For this purpose blocking oscillator 145 is energized from one-shot 110 when the third pulse is transmitted from modulator 42. Oscillator 145 supplies a 1μ square wave pulse on conductor 144, to disable AND gate 125, and on conductor 236 to gain control unit 190, where it is differentiated and clipped to supply a waveform having a steep leading edge and a training edge that decreases exponentially over approximately 20μ. By this means relatively strong reflected pulses from the earth below are prevented from having an adverse effect, when the local station is moving in a low flying aircraft at some distance from a remote ground station, for example.

For the above it will be apparent that by the use of a pair of simultaneously delayed gates of different lengths I have provided an improved ranging system combining rapidity of search for the appropriate range with accuracy indication when the desired range has been found and of tracking when the range changes.

I claim as my invention:

1. In a radio distance measuring system, the method of searching for return pulses which comprises the steps of transmitting a train of pulses from a measuring location; receiving at said location pulses returned from a distant location; generating a pair of gates of different lengths at said measuring location each time a pulse of said train is transmitted; delaying said gates simultaneously with respect to successive pulses of said train by intervals which increase at a first predetermined rate until a received pulse occurs within the longer of said gates; and thereafter reducing said rate until the received pulse occurs within the shorter of said gates.

2. In a radio distance measuring system, the method of searching for return pulses which comprises the steps of generating a train of pulses at a measuring location; transmitting from said location signals determined by the pulses of said train; receiving at said location pulses returned from a distant location in response to the transmitted signals, the delay at said location between a generated pulse and a received pulse varying with the distance between said locations; generating a pair of co-initial gates of different lengths at said measuring location each time a pulse of said train is generated; delaying said gates simultaneously with respect to successive pulses of said train, by intervals which increase at a first predetermined rate until a received pulse occurs within the longer of said gates; reducing the rate of increase of said intervals until a received pulse occurs within both said gates; and preventing further change in the delay of said gates when said received pulse occurs at a particular position within the shorter of said gates.

3. In combination: means for producing a train of gate pulses delayed after successive ones of a train of cyclically occurring timing pulses, the delay initially varying at a predetermined rate; means producing return pulses in a cycle determination by the cycle of said timing pulses; and means connected to the above named means and effective when the return pulses occur during said gate pulses to reduce the rate of variation of the delay of said gate pulses to a second predetermined rate.

4. Apparatus according to claim 3 in which the first named means includes a first ramp generator having a natural period and a predetermined peak value, an integrator, means effective when the output of said generator reaches said predetermined value to reset said integrator so that said output assumes a standard low value, means initially supplying a signal of fixed value to said integrator so that said integrator acts initially as a second ramp generator having a period which is long compared to the period of said first generator, a comparator giving an output whenever a first of two inputs thereto becomes greater than the second of said inputs, means connecting said first and second ramp generators to said comparator to supply said first and second inputs respectively, means connected for actuation by said comparator output to reset said first ramp generator, so that the delay of the output of said comparator initially increases at a rate determined by the slope of the second ramp generator, and means for cyclically triggering said first generator and simultaneously causing transmission of a radio signal; and in which said gate pulses are triggered by the output of said comparator.

5. In combination:
means for producing a train of pairs of gate pulses of different lengths delayed after successive single pulses of a train of cyclically occurring timing pulses, the delay initially varying at a predetermined rate;
means producing return pulses in a cycle determined by the cycle of said timing pulses; and
means connected to the above named means and effective when the return pulses occur during the longer of said gate pulses to reduce the rate of variation of the delay of said gate pulses.

6. Apparatus according to claim 5 and further means connected to the first and second named means and effective when the return pulses occur during both said gates to further reduce said rate of variation.

7. In combination: a first ramp generator having a natural period and a predetermined peak value; an integrator; means effective when the output of said generator reaches said predetermined value to reset said integrator so that said output assumes a standard low value; means initially supplying a signal of fixed value to said integrator so that said integrator acts initially as a second ramp generator having a period which is long compared with the period of said first generator; a comparator giving an output whenever a first of two inputs thereto becomes greater than the second of said inputs; means connecting said first and second ramp generators to said comparator to supply said first and second inputs respectively; means connected for actuation by said comparator output to reset said first ramp generator, so that the delay of the output of said comparator initially increases at a rate determined by the slope of the second ramp generator; means for cyclically triggering said first generator and simultaneously causing transmission of a radio signal; means for generating a pair of gates of different lengths triggered simultaneously by the output of said comparator; means for accepting signals received from a remote point in response to the transmitted radio signals, and for applying the received signals to both said gates simultaneously; means effective when a received signal is coincident with the longer of said gates to reduce the value of the fixed signal supplied to said integrator, whereby to change the slope of the second ramp; means effective when a received signal is coincident with both said gates to further decrease the value of said fixed signal; and supervisory means actuated in accordance with the output of said integrator.

References Cited

UNITED STATES PATENTS

| | | | |
|---|---|---|---|
| 2,717,999 | 9/1955 | Lewinstein | 343—7.3 |
| 2,979,712 | 4/1961 | Lair | 343—7.3 |
| 3,239,835 | 3/1966 | Crow | 343—7.3 |

RODNEY D. BENNETT, JR, Primary Examiner

T. H. TUBBESING, Assistant Examiner